United States Patent
Vogt et al.

(10) Patent No.: US 8,934,487 B2
(45) Date of Patent: Jan. 13, 2015

(54) NETWORK TOPOLOGY CONCEALMENT USING ADDRESS PERMUTATION

(75) Inventors: Christian Vogt, San Jose, CA (US); Petri Jokela, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1006 days.

(21) Appl. No.: 12/613,080

(22) Filed: Nov. 5, 2009

(65) Prior Publication Data

US 2011/0103394 A1    May 5, 2011

(51) Int. Cl.
  *H04L 12/28*    (2006.01)
  *H04L 29/12*    (2006.01)
  *H04L 29/06*    (2006.01)

(52) U.S. Cl.
  CPC ...... *H04L 61/6059* (2013.01); *H04L 29/12367* (2013.01); *H04L 29/12481* (2013.01); *H04L 29/12801* (2013.01); *H04L 29/12915* (2013.01); *H04L 61/2514* (2013.01); *H04L 61/2557* (2013.01); *H04L 61/6004* (2013.01); *H04L 63/0407* (2013.01)
  USPC ........... 370/392; 370/255; 370/352; 370/400; 370/401; 370/466; 370/469; 370/474; 370/476; 709/203; 709/224; 709/225; 709/228; 709/231; 709/233; 709/234; 709/235

(58) Field of Classification Search
  None
  See application file for complete search history.

(56) References Cited

U.S. PATENT DOCUMENTS 6,826,684 B1 *  11/2004  Fink et al. ............... 713/160
7,757,272 B1 *   7/2010  Dean ......................... 726/2

OTHER PUBLICATIONS

Wasserman, M. et al. "IPv6-to-IPv6 Network Address Translation (NAT66) draft-mrw-behave-nat66-02.txt," Behave WG, Internet-Draft, Intended Status: Standards Track, Nov. 2008, 16 pages.
Braden, R. et al. "Computing the Internet Checksum," Network Working Group, Request for Comments: 1071, Sep. 1988, 25 pages.
Thomson, S. et al. "IPv6 Stateless Address Autoconfiguration," Network Working Group, Request for Comments: 2462, Dec. 1998, 26 pages.
Hinden, R. et al. "Unique Local IPv6 Unicast Addresses," Network Working Grouop, Request for Comments: 4193, Oct. 2005, 18 pages.

(Continued)

*Primary Examiner* — Faruk Hamza
*Assistant Examiner* — Aixa A Guadalupe-Cruz
(74) *Attorney, Agent, or Firm* — Blakely Sokoloff Taylor & Zafman, LLP

(57) ABSTRACT

A first packet is received from a client over an internal network destined for a remote node of an external network. The first packet includes a source IP address having an internal network portion that identifies a location of the client in the internal network and an external network portion that identifies a location of the internal network accessible by the external network. An obfuscation operation is performed on the internal network portion of the source IP address of the first packet to conceal the location of the client in the internal network and the internal network portion of the source IP address of the first packet is rewritten with the obfuscated internal network portion while maintaining the current external network portion of the source IP address. Thereafter, the first packet is transmitted to the remote node over the external network.

16 Claims, 9 Drawing Sheets

(56) References Cited

OTHER PUBLICATIONS

Christian Vogt: "Qualifying the Harmfulness of Address Translation; draft -vogt-address-translation-harmfulness-03. txt", Qualifying the Harmfulness of Address Translation; Draft-Vogt-Address-Translation-Harm Fuln Ess-03. Txt, Internet Engineering Task Force, IETF; Standardworkingdraft, Internet Society (ISOC) 4, Rue Des Falaises CH-1205 Geneva, Switzerland, No. 3, Jul. 13, 2009, XP015063594, [retrieved on Jul. 14, 2009].

Daley G: "Achieving Addressing Functions in IPv6 without using NAT; draft-daley-ipv6-nonat6-01.txt", Achieving Addressing Functions in IPV6 Without Using NAT; Draft-Daley-IPV6-NONAT6-01. Txt, Internet Engineering Task Force, IETF; Standardworkingdraft, Internet Society (ISOC) 4, Rue Des Falaises CH-1205 Geneva, Switzerland, No. 1, Jul. 14, 2009, XP015063565, [retrieved on Jul. 14, 2009].

* cited by examiner

| Permuation Method ID | Source IP | Destination IP | Source Port | Destination Port | ⋮ |
|---|---|---|---|---|---|
| ⋮ | ⋮ | ⋮ | ⋮ | ⋮ | ⋮ |

FIG. 6

NETWORK TOPOLOGY CONCEALMENT USING ADDRESS PERMUTATION

FIELD OF THE INVENTION

Embodiments of the invention relate generally to the field of network computing; and more particularly, to techniques for concealing network topology using network address permutations.

BACKGROUND

Internet protocol (IP) addresses encode the topological location of a point of network attachment and thus can reveal information about the topology of a network to peers outside the network. Revealing topological information constitutes security vulnerability, since the information can be useful in planning attacks against the network. Attackers may use this information to identify attack targets. For example, a denial-of-service attack against a server may more easily be executed via a host on the server's link, and such a host can typically be identified based on comparing its address to the address of the server in question. Depending on the security requirements of a network, the concealment of network topology may therefore be considered important.

The problem of revealing network-topological information is hard because the encoding of this information in IP addresses is a key component of Internet routing. Traditional methods to defend network security, such as firewalls and encryption mechanisms, do not solve the problem because they do not alter IP addresses. The only existing method to conceal the topology of networks is the address translation, also known as network address translation (NAT). Address translators separate the addresses used internally within a network from the addresses at which the network is externally reachable by peers on the Internet. They multiplex the set of internal addresses onto one, or a few, external addresses. Since only internal addresses, but no external addresses, encode topological information about the network, topological information is concealed from peers on the Internet.

As of today, address translation, as a means for network topology concealment, is only available for IP version 4 (IPv4). Although address translators have recently been proposed for IP version 6 (IPv6), these do not support network topology concealment because they copy the topologically significant information between internal and external addresses.

IPv4 address translators inspect port numbers from received packets when de-multiplexing packets received at an external address back onto the corresponding internal address. The mapping from a port number to an internal address is stateful, since the mapping between port numbers and internal addresses must be stored for each packet flow. The stateful address de-multiplexing of IPv4 address translators has disadvantages. First, hosts behind an address translator cannot be contacted from peers on the Internet because the external address at which they are reachable to the peers is not unique. In addition, packet flows that are initiated via an address translator must continue to traverse this address translator due to the state that address translators maintain. Rerouting to a different path in case of failure is impossible. Furthermore, address translators cannot process packet flows without changeable port numbers. This includes packet flows without port numbers, as well as packet flows where the port numbers are part of an encrypted or authenticated portion of the packets.

Due to these disadvantages, address translators are widely considered "harmful" and to be avoided where necessary. Unfortunately, there is as yet no alternative solution for network topology concealment.

SUMMARY OF THE DESCRIPTION

A mechanism in a network element interfacing an internal network with an external network for translating an Internet Protocol (IP) address of a client of the internal network and using the translated IP address to route packets associated with the client to and from a remote node of the external network without exposing an internal network portion of the IP address of the client to the remote node is provided. According to one aspect of the invention, a first packet is received from the client over the internal network that is destined for a remote node of the external network. The first packet includes a source IP address separated into an internal network portion that identifies a location of the client in the internal network and separated into an external network portion that identifies a location of the internal network accessible by the external network. An obfuscation operation is performed on the internal network portion of the source IP address of the first packet to conceal the location of the client in the internal network and the internal network portion of the source IP address of the first packet is rewritten with the obfuscated internal network portion while maintaining the current external network portion of the source IP address. Thereafter, the first packet is transmitted to the remote node over the external network with the rewritten internal network portion of the source IP address, where the location of the client in the internal network is concealed from the remote node while allowing the remote node to reach the internal network through the external network portion of the source IP address.

According to another aspect of the invention, a first packet is received from a remote node over the external network destined for a client, where the first packet includes a destination IP address having an internal network portion that has been obfuscated. A deobfuscation operation is performed on the internal network portion of the destination IP address of the first packet to reveal a location of the client in the internal network. The destination IP address of the first packet is replaced with the deobfuscated destination IP address. Thereafter, the first packet is transmitted to the client over the internal network, where the client is reachable by the remote node without revealing the location of the client in the internal network.

According to a further aspect of the invention, in response to a first packet received from a first remote node over the external network destined to a first client of the internal network, a first permutation method is identified based on the first packet. A first permutation is performed on a destination IP address of the first packet according to the first permutation method, generating a second packet having a first permuted destination IP address. The second packet is transmitted to the first client according to the first permuted destination IP address over the internal network. In response to a third packet received from a second remote node over the external network destined to a second client of the internal network, a second permutation method is identified based on the third packet. A second permutation is performed on a destination IP address of the third packet according to the second permutation method, generating a fourth packet having a second permuted destination IP address. The fourth packet is transmitted to the second client according to the second permuted destination IP address over the internal network, where the first and second permuted IP addresses allow the first and second remote nodes to reach the first and second clients respectively without revealing locations of the first and second clients of the internal network.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

FIG. 6 is a block diagram illustrating a data structure for storing mapping information between data flows and permutation methods according to one embodiment of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

According to some embodiments of the invention, a solution for network topology concealment is provided that avoids the disadvantages of existing solutions. It achieves this through address translation that, in contrast to existing solutions, neither requires state per packet flow, nor access to changeable port numbers in the packets being translated. In one embodiment, an address space of a network is divided in segments: 1) a first segment for internal use; and 2) a second segment for external use. An invertible function is defined that maps each element in the set of internal addresses to an element in the set of external addresses. The function defined is mathematically called an obfuscation. In one embodiment, a permutation is utilized as an example of the obfuscation. That is, an invertible function from an integer set $\{1 \ldots n\}$ into itself is utilized, where n is the common size of the sets of internal and external addresses. An address permutation is followed by a checksum adjustment to compensate for changes in the checksum that the address permutation may have caused. A permutation and a checksum adjustment, as well as the respective inverse operations, can be calculated without per-packet-flow state. Techniques described throughout this application can be applied to IPv4 and IPv6 network configurations.

Figure 1:
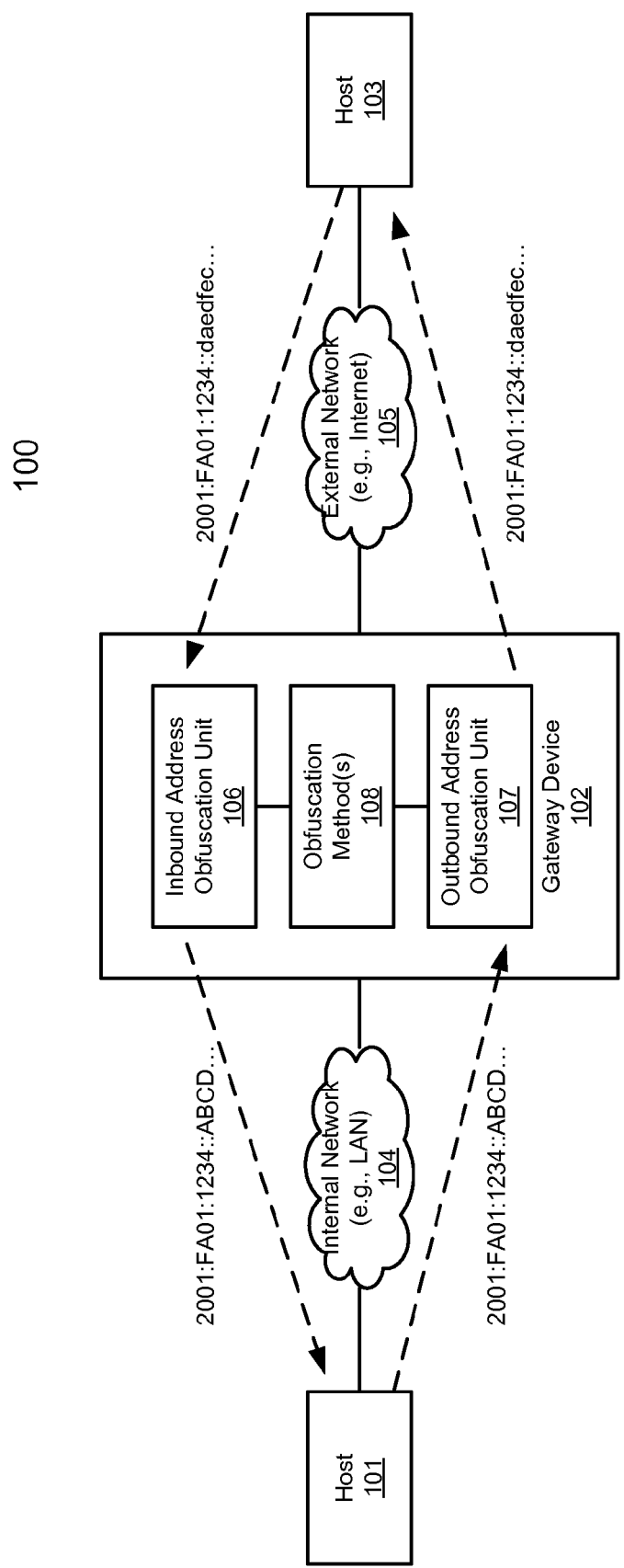
FIG. 1 is a block diagram illustrating a network configuration according to one embodiment of the invention.

FIG. 1 is a block diagram illustrating a network configuration according to one embodiment of the invention. Referring to FIG. 1, network configuration 100 includes a host (e.g., client) 101 communicatively coupled to a gateway device 102 over an internal network 104, where the gateway device 102 interfaces the internal network 104 with an external network 105 to allow host 101 to communicate with another host 103 of the external network 105. Network 104 may be a local area network (LAN) and may be a combination of one or more networks (e.g., wired or wireless networks). Network 105 may be a wide area network (WAN) such as the Internet and it may be a combination of one or more networks (e.g., wired or wireless networks).

Host 101 and host 103 may be any kind of computing node such as a desktop or laptop computer, a personal digital assistant (PDA), a mobile phone device, a server, or a combination of these devices. Note that for the purpose of illustration, only one node of the internal network 104 and one node of the external network 105 are shown in FIG. 1; however, more nodes may be coupled to either of the networks 104-105.

Gateway device 102 may be a variety of different gateway devices or edge routers. For example, gateway device 102 may be a SmartEdge™ router available from Ericsson of Stockholm, Sweden. Gateway device 102 is adapted to route network traffic between a host (e.g., host 101) of internal network 104 and a host (e.g., host 103) of external network 105. Note that there may be multiple gateway devices interfacing internal network 104 and external network 105, for example, for redundancy or load balance purposes.

In one embodiment, gateway device 102 includes, among other components such as a routing logic, an inbound address obfuscation unit 106 and an outbound address obfuscation unit 107 that are adapted to perform an obfuscation operation on an IP address of an inbound packet and an outbound packet respectively, using an obfuscation method 108 stored in a machine-readable medium (e.g., memory or disk) of gateway device 102. The address obfuscation units 106-107 may be implemented as logic which may include software, hardware, or a combination of both.

According to one embodiment, in response a packet received from host 101 of the internal network 104 that is destined to host 103 of the external network 105, outbound address obfuscation unit 107 is adapted to obfuscate at least a portion of a source IP address representing host 101 (e.g., 2001:FA01:1234::ABCD . . . ) using obfuscation method 108 and use the obfuscated source IP address (e.g., 2001:FA01: 1234::daedfec . . . ) as a new source IP address (e.g., replacing the original source IP address of the packet with the obfuscated source IP address) prior to transmitting the packet to host 103 over the external network. As a result, host 103 is not able to determine the network topology of internal network 104 based on the obfuscated source IP address of the packet.

Similarly, according to another embodiment, in response to a packet received from host 103 over external network 105 that is destined to host 101 of internal network 104, inbound address obfuscation unit 106 is adapted to deobfuscate at least a portion of a destination IP address representing host 101 (e.g., 2001:FA01:1234:: daedfec . . . ) using obfuscation method 108 and use the deobfuscated destination IP address (e.g., 2001:FA01:1234::ABCD . . . ) as a new destination IP address (e.g., replacing the destination source IP address of the packet with the deobfuscated destination IP address) prior to transmitting the packet to host 101 over the internal network 104. Here, the deobfuscated destination IP address is the original IP address associated with host 101. As a result, host 103 is able to reach host 101 without having to reveal the network topology of internal network 104. Note that inbound address obfuscation unit 106 and outbound address obfuscation unit 107 may be implemented as a single processing logic.

According to one embodiment, the obfuscation method 108 includes one or more permutation methods. An IP address is divided into two segments: 1) external network portion that allows a host of the external network to reach the internal network; and 2) an internal network portion that allows a host of the external network to reach a particular host or segment of the internal network. According to one embodiment, one or more address permutations are performed on the internal network portion of an IP address without modifying the external network portion of the IP address. Throughout this application, a permutation is utilized as an example of an obfuscation method. However, it is not so limited; other methods may also be applied herein.

Figure 2:
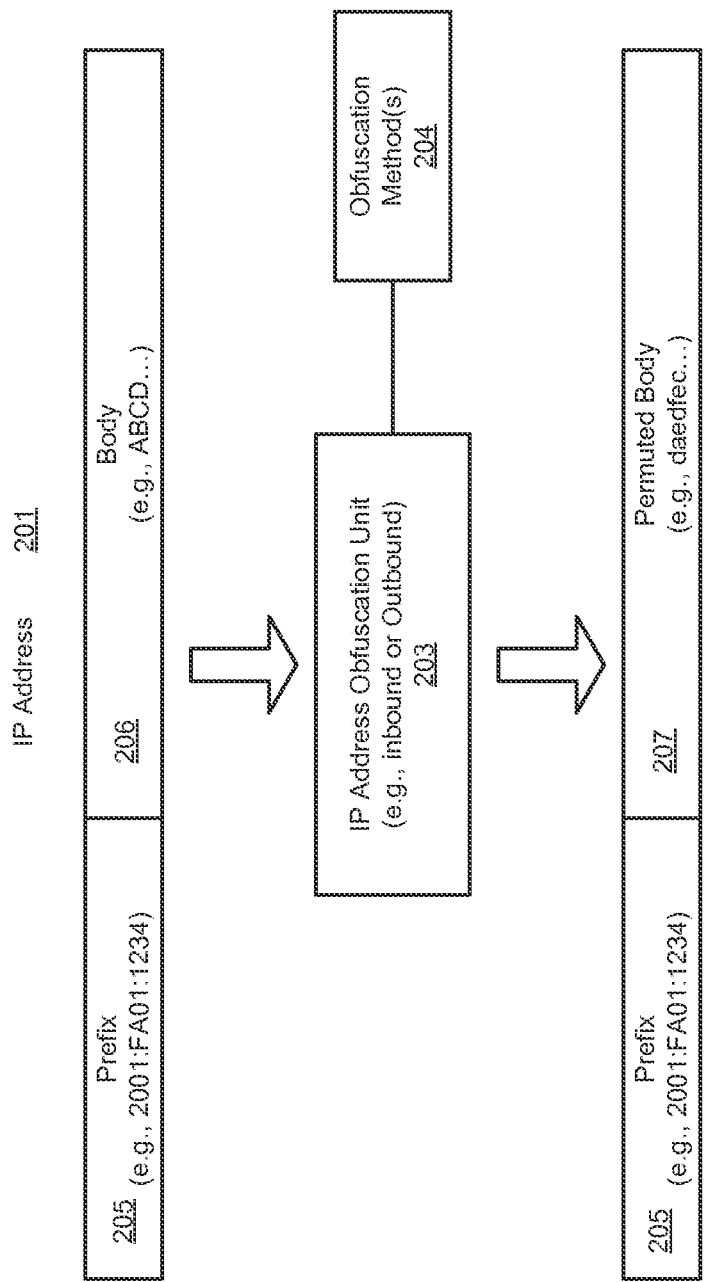
FIG. 2 is a block diagram illustrating a processing flow of an address permutation operation according to one embodiment.

FIG. 2 is a block diagram illustrating a processing flow of an address permutation operation according to one embodiment. Referring to FIG. 2, IP address 201 includes at least two segments: 1) prefix portion 205 (e.g., external network portion) and 2) body 206 (e.g., internal network portion). The address permutation unit 203 (e.g., a part of address obfuscation units 106 and/or 107 of FIG. 1) is adapted to perform a permutation operation on body 206 of IP address 201 using a permutation method 204 (e.g., a part of obfuscation method 108 of FIG. 1), which generates IP address 202 having a permuted body 207 without modifying prefix 205. In one embodiment, the permutation operation includes at least one of a bit swap, a bit flip, or a combination of both bit swap and bit flip operations. Note that such a permutation is performed dynamically by the address permutation unit 203 without having to maintain mapping information between an original IP address and a translated IP address and without having to store such information in a storage device (e.g., memory or disk).

As mentioned above, the techniques for network topology concealment described throughout this application can be implemented in nodes on network borders (e.g., gateway devices or edge routers 102) that perform two operations on each packet entering and leaving the network: 1) rewriting the local address (e.g., internal network portion) in the packets by applying a permutation on the local address. The local address of a packet entering the network is the packet's destination address, whereas the local address of a packet leaving the network is the packet's source address; and 2) adjusting the checksum of the packets.

In one embodiment, the permutation affects those bits in an address that are used for routing within the network being protected (e.g., internal network portion), but not the address bits used for routing towards the network (e.g., external network portion). More specifically, out of an address' three components: 1) routing prefix; 2) subnet identifier; and 3) interface identifier, the rewriting affects the latter two portions only (e.g., subnet identifier and interface identifier). The subnet identifier locates a host's link within its network and the interface identifier locates the host on this link. By permuting these components in a host's address, the host's location within its network (e.g., internal network) can no longer be derived from the permuted address. On the other hand, the routing prefix locates a network (e.g., internal network) within the Internet (e.g., external network). Leaving the routing prefix unchanged therefore permits packets to reach the network from arbitrary sources in the Internet, even if some address bits have been permuted.

Permutations should be kept secret. Exposure of a permutation to an attacker would enable the attacker to derive network-topological information from a permuted address by reverting the permuted address back into the corresponding original address. For example, in a deployment scenario, a permutation may be known only to certain persons of an organization entity such as network administrators.

Since a permutation is applied on every packet traversing a network border, it is important that permutations are executed efficiently. In one embodiment, this can be achieved by representing a permutation as a sequence of bit swap operations and/or bit flip operations. For example, a bit swap operation swap (i, j) exchanges address bits i and j, and a bit flip operation flip (i) inverses address bit i. Sequences of bit swap and bit flip operations can be efficiently executed. Although the set of permutations that can be represented through such a sequence is only a subset of all permutations, this subset is large and hence is sufficient for the purpose of the address translations. Implementations of embodiments may be augmented with tools to automate the generation of sequences of bit swap and bit flip operations, in order to aid network administrators establishing a permutation for use in their networks.

Since the permutation of address bits implies a change in the checksum of a packet, each permutation may be accompanied by an adjustment of the checksum in order to avoid unintended packet drops. This is achieved by re-computing the checksum after a permutation operation, and rewriting the checksum in the packet with the new value that corresponds to the permuted address in the packet.

The technique described throughout this application conceals the topology of a network (e.g., internal network) from peers on the Internet (e.g., external network). This prevents malicious peers from preparing attacks against the network based on knowledge of the network's topology. It enables peers on the Internet to contact a host whose address is being rewritten or obfuscated. It enables re-routing of packet flows in case of failure, even if the new path of a packet flow traverses a different network border link than the one on the original path. For example, when one gateway device is down, another gateway device can "pick" it up without static configuration of network address mapping. That is, since a gateway device does not maintain a static mapping table, as long as it utilizes the same obfuscation method (e.g., permutation method), it can generate the same IP address as other gateway devices. In addition, it does not require port numbers in the packets being rewritten, and hence it operates properly for packet flows that have no, or no changeable port numbers.

These benefits are due to the techniques described herein being stateless, whereas conventional solutions require state per packet flow. The statelessness of the techniques described herein furthermore reduces implementation complexity and cost. The implementation complexity is reduced because no or less state management operations are needed, including establishment, lookup, and garbage disposal, etc. The implementation cost is reduced due to the absence of memory for storing per-packet-flow states.

Figure 3:
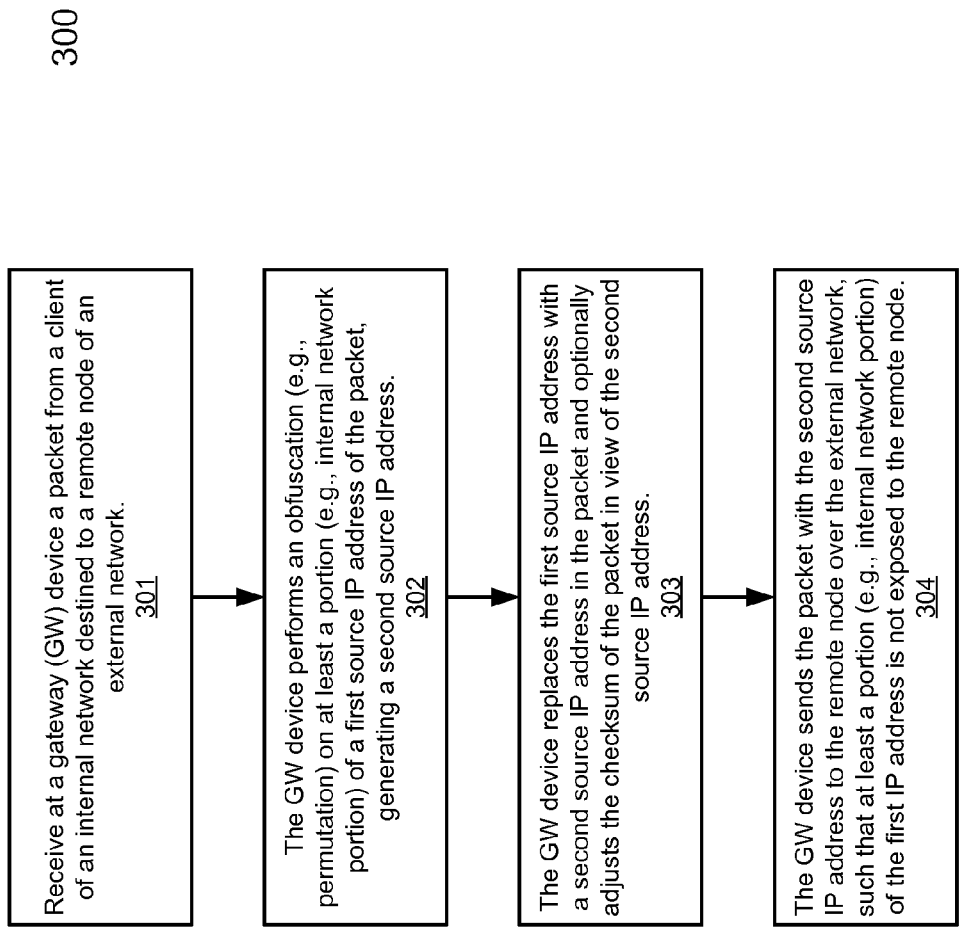
FIG. 3 is a flow diagram illustrating a method for obfuscating an IP address of an outbound packet according to one embodiment of the invention.

FIG. 3 is a flow diagram illustrating a method for obfuscating an IP address of an outbound packet according to one embodiment of the invention. Note that method 300 may be performed by processing logic which may include software, hardware, or a combination both. For example, method 300 may be performed by outbound obfuscation unit 107 of gateway device 102 of FIG. 1. Referring to FIG. 3, at block 301, a packet is received at a gateway device from a local client or host of an internal network that is destined to a remote node of an external network. At block 302, the gateway device performs an obfuscation operation (e.g., permutation) on at least a portion of a first source IP address (e.g., internal network portion of the IP address) of the packet, generating a second source IP address (e.g., permuted source IP address). At block 303, the gateway device replaces the first source IP address with the second source IP address in the packet. In addition, if needed, the checksum of the packet is recalculated or adjusted. At block 304, the gateway device transmits the packet with the second source IP address to the remote node over the external network, such that at least a portion of the firs source IP address (e.g., internal network portion) is not exposed to the remote node. As a result, the remote is unable to determine the topology of the internal network based on a source IP address of the packet received from the gateway.

Figure 4:
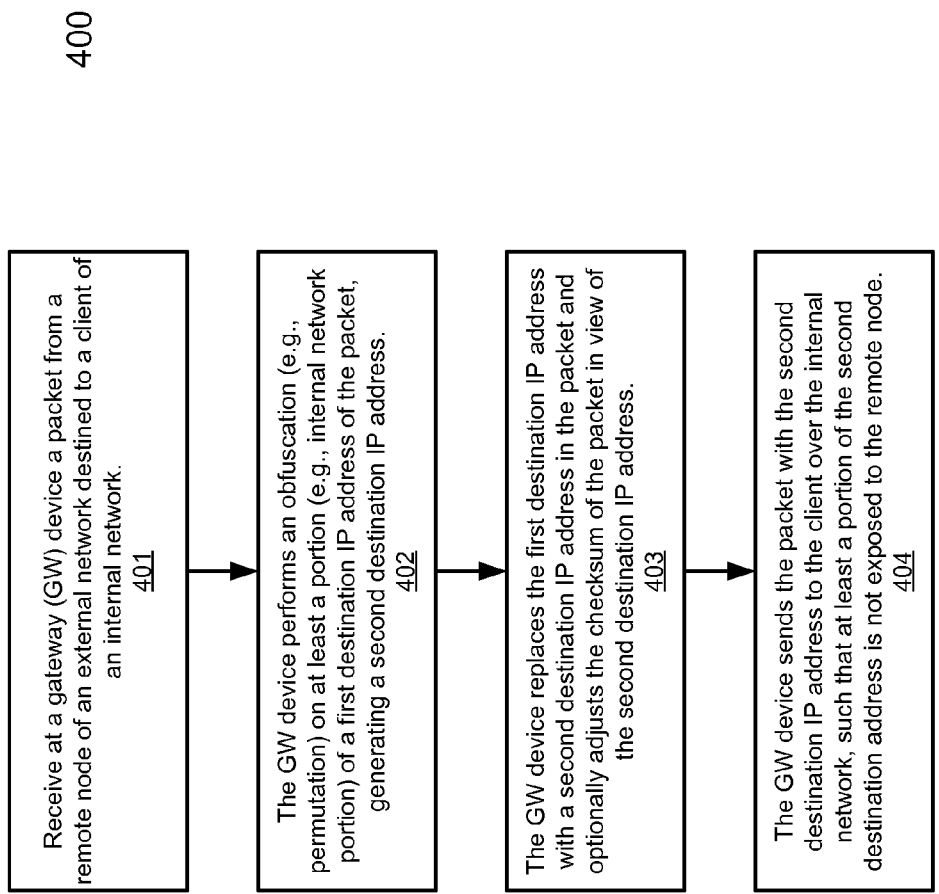
FIG. 4 is a flow diagram illustrating a method for obfuscating an IP address of an outbound packet according to one embodiment of the invention.

FIG. 4 is a flow diagram illustrating a method for obfuscating an IP address of an outbound packet according to one embodiment of the invention. Note that method 400 may be performed by processing logic which may include software, hardware, or a combination both. For example, method 400 may be performed by inbound obfuscation unit 106 of gateway device 102 of FIG. 1. Referring to FIG. 4, at block 401, a gateway device receives a packet from a remote node over an external network, where the packet is destined to a local node of an internal network. In response, at block 402, the gateway device performs a deobfuscation operation (e.g., an inverted permutation) on at least a portion of the first destination IP address of the packet, generating a second destination IP address. At block 403, the gateway device replaces the first destination IP address of the packet with the second destination IP address. In addition, if needed, the checksum of the packet is recalculated or adjusted. At block 404, the gateway device transmits the packet with the second destination IP address to the local node over the local network, such that at least a portion of the second destination IP address is not exposed to the remote node. As a result, the remote node is able to reach the local node of the internal network without revealing the topology of the internal network.

As describe above, IP addresses encode the topological location of a point of network attachment and thus can reveal information about the topology of a network to peers outside the network. Revealing topological information constitutes security vulnerability, since the information can be useful in planning attacks against the network. For example, a denial-of-service attack against a server may more easily be executed via a host on the server's link, and such a host can typically be identified based on comparing its address to the address of the server in question. Depending on the security requirements of a network, the concealment of the network's topology may therefore be considered important.

The technique as described above is provided to conceal the topology of a network in a manner that is wider applicable, less disruptive, and simpler to implement than existing solutions. It divides an address space of a network in segments—one segment for internal use and one segment for external use—and defines an invertible function, a permutation, that maps each element in the set of internal addresses to an element in the set of external addresses. Thus, network-topological information is borne only in internal addresses, but not in the external addresses that are visible to potentially malicious peers.

The security provided by such a technique relies on the secrecy of the permutation method, similar to how the password to a user account on a computer must be kept secret to protect the user account against illegitimate logins. Leakage of the permutation method could enable an attacker to gain knowledge of the topology of a network, since it would allow an attacker to derive the internal addresses of hosts inside the network given the hosts external addresses. In order to limit the potential damage in case of leakage of a permutation method, network administrators may want to occasionally change the permutation method, just as the password to a user account on a computer is changed occasionally. However, changing the permutation has the drawback that it may disrupt existing or active communication sessions, because a change in the permutation method also changes the external address of a host.

According to some embodiments, a mechanism is provided herein to change a permutation method without disrupting active communication sessions. It enables differentiation between packet flows established with the old permutation method from packet flows established with the new permutation method, so that both types of packet flows can be processed consistently with the permutation method they were established with.

As shown in FIG. 1, on the internal network side, all hosts are using the internal IP addresses, and the permuting node (e.g., gateway 102) residing on the border of a site (e.g., internal network 104), makes an address permutation operation for egress packets' internal IP addresses, modifying the interface ID and subnet ID parts of the internal IP address using a permutation function f( ) to generate the external IP address. Using this method, both the host's own interface ID and the subnet structure for the internal network can be hidden from a potential attacker residing on the external network side. For ingress packets, a reverse operation is made to reconstruct the original subnet and interface ID parts. The packet can then be routed to the host in the internal network. Permutations, as well as their reverse, are stateless operations.

From the security point of view, maintaining the same permutation function method over a long period of time is disadvantageous. It enables an attacker to gain knowledge about the permutation and, hence, about the internal structure of the network. One way in which this can happen is through statistical analysis on a collected set of permuted addresses. Another way is through leakage of a description of the permutation method in use. To solve the problem, there needs to be a method to change the used permutation function from time to time.

The disadvantage of changing a permutation is that it entails a change of the internal host's external address. This means that existing communication sessions between two hosts cannot survive. To avoid this problem, a grace period is needed, during which the old permutation can be used alongside the new one. This requires the permuting node to memorize for which packet flows the old permutation method must be used, and for which the new one must be used.

According to one embodiment, a temporary flow state is maintained in a permuting node (e.g., gateway device). The flow state is used to identify those packet flows that use the old permutation method versus the new permutation method. This enables the permuting node to distinguish packet flows that use the old permutation method from packet flows that use the new permutation method. It is assumed that after the grace period, there are either none, or negligibly few, communication sessions that use the old permutation method, so that it is safe to discard flow state and use the new permutation method exclusively.

Figure 5:
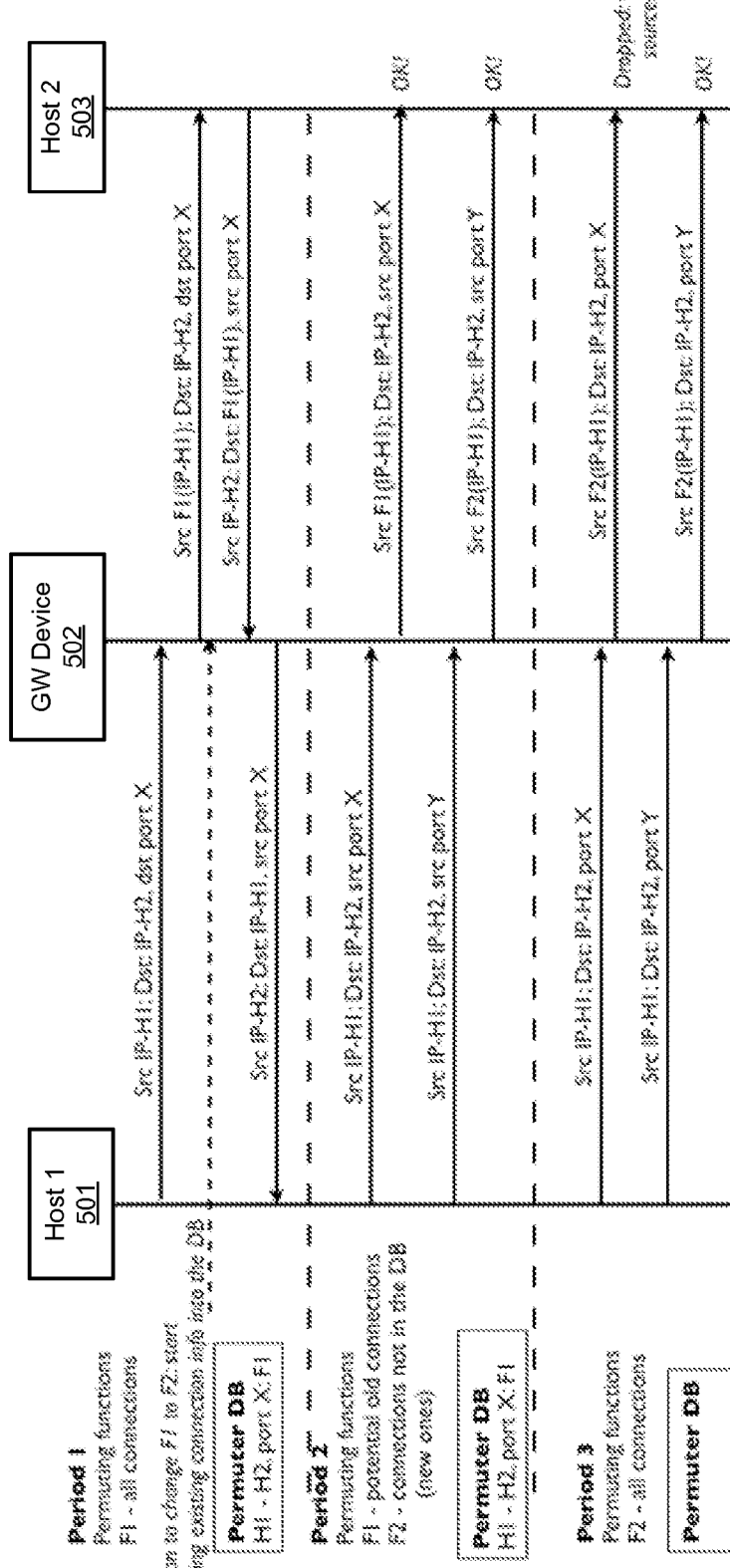
FIG. 5 is a transactional diagram illustrating a method for changing an obfuscation method without disrupting an existing communication session according to one embodiment.

FIG. 5 is a transactional diagram illustrating a method for changing an obfuscation method without disrupting an existing communication session according to one embodiment. Referring to FIG. 5, the operations of the permuting node (e.g., gateway device 502), where the original permutation F1( ) is changed to permutation F2( ). At the initial phase, permutation F1( ) is used to permute the subnet and interface ID parts of the internal addresses for the egress packets from host 501. For the ingress packets from host 503, a reverse function F1'( ) is used to reconstruct the original internal subnet and interface ID parts: internal_iface_ID=F1' (F1 (internal_iface_ID). At this stage, the permuting node does not maintain any flow state.

At some point, a decision is made that the permutation is to be changed to F2( ). Before the new permutation can be taken into use for all packets, there is a grace time period during which the permuting node collects flow-specific information from existing communications sessions that can be used to identify those communication sessions. This information may be a local address in combination with either a local port number or a local IPsec SPI value. The information is stored as flow state for use during the subsequent grace period, for example, as a lookup table as shown in FIG. 6. It enables the permuting node to distinguish old communication sessions, which use the old permutation method, from new communication sessions, which use the new permutation method. At this phase, the permuting node is no longer stateless.

When the grace period starts and the new permutation F2( ) is taken into use, flow-specific information from the egress and ingress packets are extracted and matched against the flow state collected before the grace period, for example, using a mapping table as shown in FIG. 6. If a packet is found to be part of a communication session for which flow state is maintained, the packet is processed using the old permutations F1( ) and F1'( ). Similarly, if a packet is found to be part of a communication session for which no flow state is maintained, the packet is processed using the new permutations F2( ) and F2'( ).

After the grace period has ended, flow state as well as the old permutation F1( ) is discarded. Should there still exist communication sessions that used the old permutations F1( ) and F1'( ), they will be dropped because the externally visible IP address changes. However, dimensioning the grace period sufficiently long will minimize this problem. The flow state, however, does not have to be maintained all the time. It only needs to be maintained while a permutation is being changed, as illustrated in FIG. 5. Periodic replacements of the permutation are useful to limit the damage that accidental leakage of the permutation may have.

Figure 7:
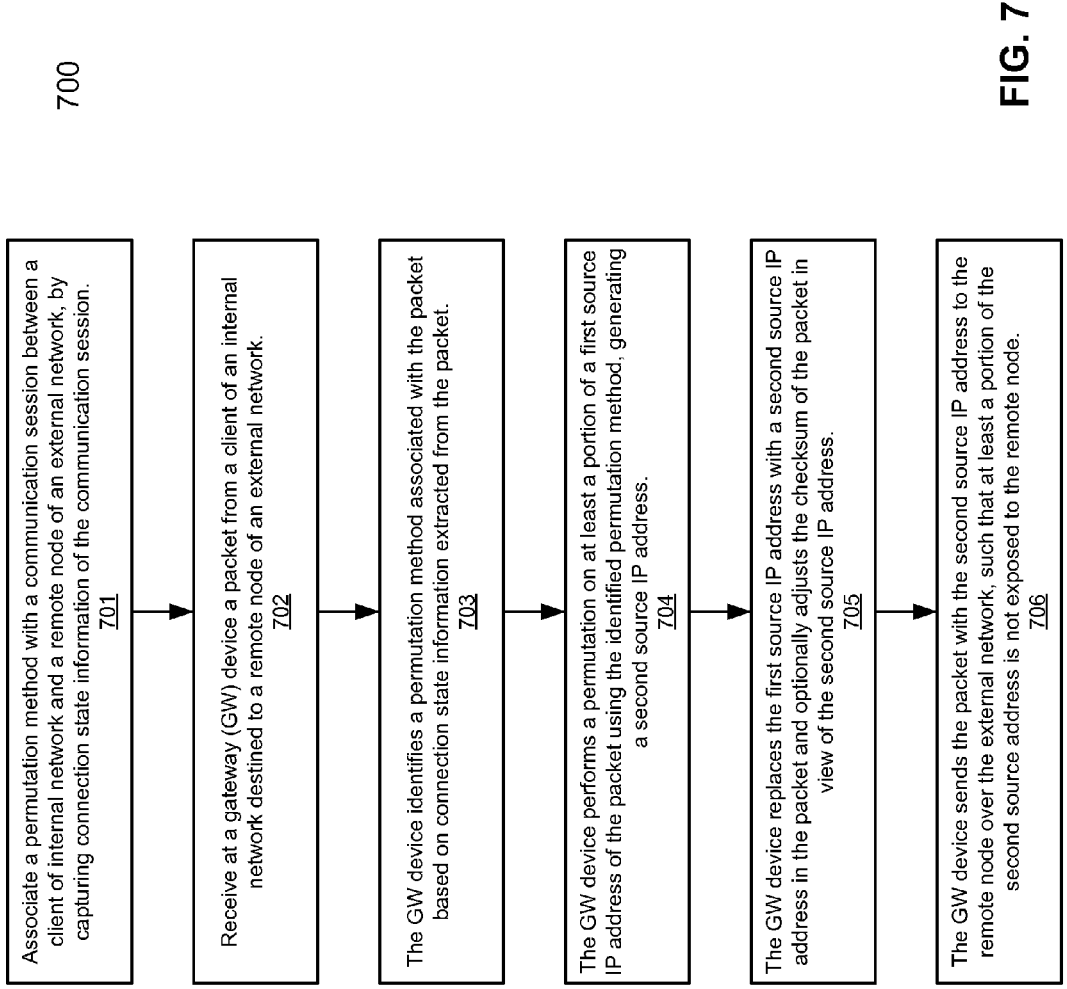
FIG. 7 is a flow diagram illustrating a method for performing an obfuscation operation on a source IP address of an outbound packet according to one embodiment.

FIG. 7 is a flow diagram illustrating a method for performing an obfuscation operation on a source IP address of an outbound packet according to one embodiment. Note that method 700 may be performed by processing logic which may include software, hardware, or a combination of both. For example, method 700 may be performed by outbound address obfuscation unit 107 of FIG. 1. In this example, permutation is utilized as an example of an obfuscation method. Referring to FIG. 7, at block 701, a permutation method is associated with a communication session between a local node of an internal network and a remote node of an external network, by capturing and storing certain state information of the communication session within a gateway device interfacing the internal network and the external network.

For example, certain state information such as source and destination IP addresses, source and destination ports of a packet of the communication session is extracted from the packet and associated with a permutation method that is used to obfuscate at least a portion of an IP address of the local node. The above state information may be stored in a data structure or database such as a table as shown in FIG. 6 within the gateway device or stored in a storage device that is accessible by the gateway device. Typically, such state information is captured and associated with a permutation method when there is a need to change the permutation method in order to preserve information regarding which session is associated with which permutation method. Such state information and the associated permutation is needed only during a grace period in which a new permutation method is utilized for a new session while an existing session is still active which utilizes an old permutation method. Once the existing session ends, the mapping information may be discarded, as going forward, the new permutation is utilized for all packets.

At block 702, when a packet is received from a local node of the internal network that is destined to a remote node of the external network, at block 703, the processing logic identifies a permutation method that is associated with a flow of the packet based on certain information extracted from the packet, such as, for example, source/destination IP address and source/destination ports, etc. The processing logic may perform a lookup operation in a table such as the one as shown in FIG. 6 by matching captured information against those stored in the table. At block 704, a permutation operation is performed on at least a portion of a first source IP address of the packet using the identified permutation method which generates a second source IP address. At block 705, the first source IP address of the packet is replaced with a second source IP address with optional adjustment of the corresponding checksum of the packet and at block 706, the packet with the second source IP address is transmitted to the remote node over the external network, such that at least a portion of the first source IP address associated with the local node is not exposed to the remote node.

Figure 8:
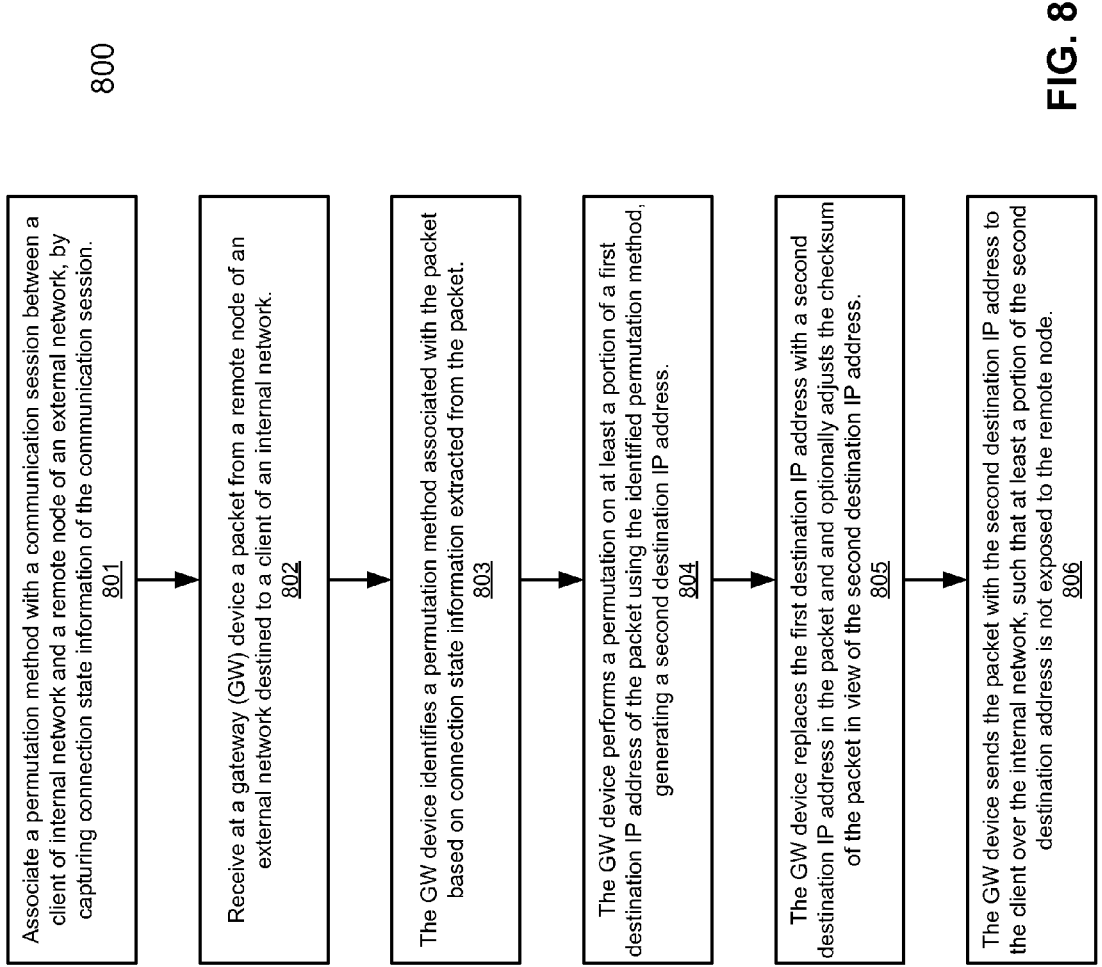
FIG. 8 is a flow diagram illustrating a method for performing an obfuscation operation on a source IP address of an inbound packet according to one embodiment.

FIG. 8 is a flow diagram illustrating a method for performing an obfuscation operation on a source IP address of an inbound packet according to one embodiment. Note that method 800 may be performed by processing logic which may include software, hardware, or a combination of both. For example, method 800 may be performed by inbound address obfuscation unit 106 of FIG. 1. In this example, permutation is utilized as an example of an obfuscation method. Referring to FIG. 8, a permutation method is associated with a communication session between a local node of an internal network and a remote node of an external network, by capturing and storing certain state information (e.g., source and destination IP addresses, and source and destination ports) of the communication session within a gateway device interfacing the internal network and the external network. The association information may be stored in a data structure or database such as the one as shown in FIG. 6.

At block 802, a packet is received from a remote node of an external network that is destined to a local node of an internal network. At block 803, a permutation method associated with the packet is identified based on the state information extracted from the packet. For example, the extracted state information is matched with those stored in a data structure or database such as the one shown in FIG. 6. At block 804, a permutation operation is performed on at least a portion of a first destination IP address of the packet using the identified permutation method, which generates a second destination IP address. At block 805, the first destination IP address is replaced with the second destination IP address in the packet with optional adjustment of the corresponding checksum of the packet and at block 806, the packet with the second destination IP address is transmitted to the local node over the internal network. As a result, the remote node is able to reach the local node without having to reveal at least a portion of the IP address associated with the local node which represents a topology of the internal network.

Figure 9:
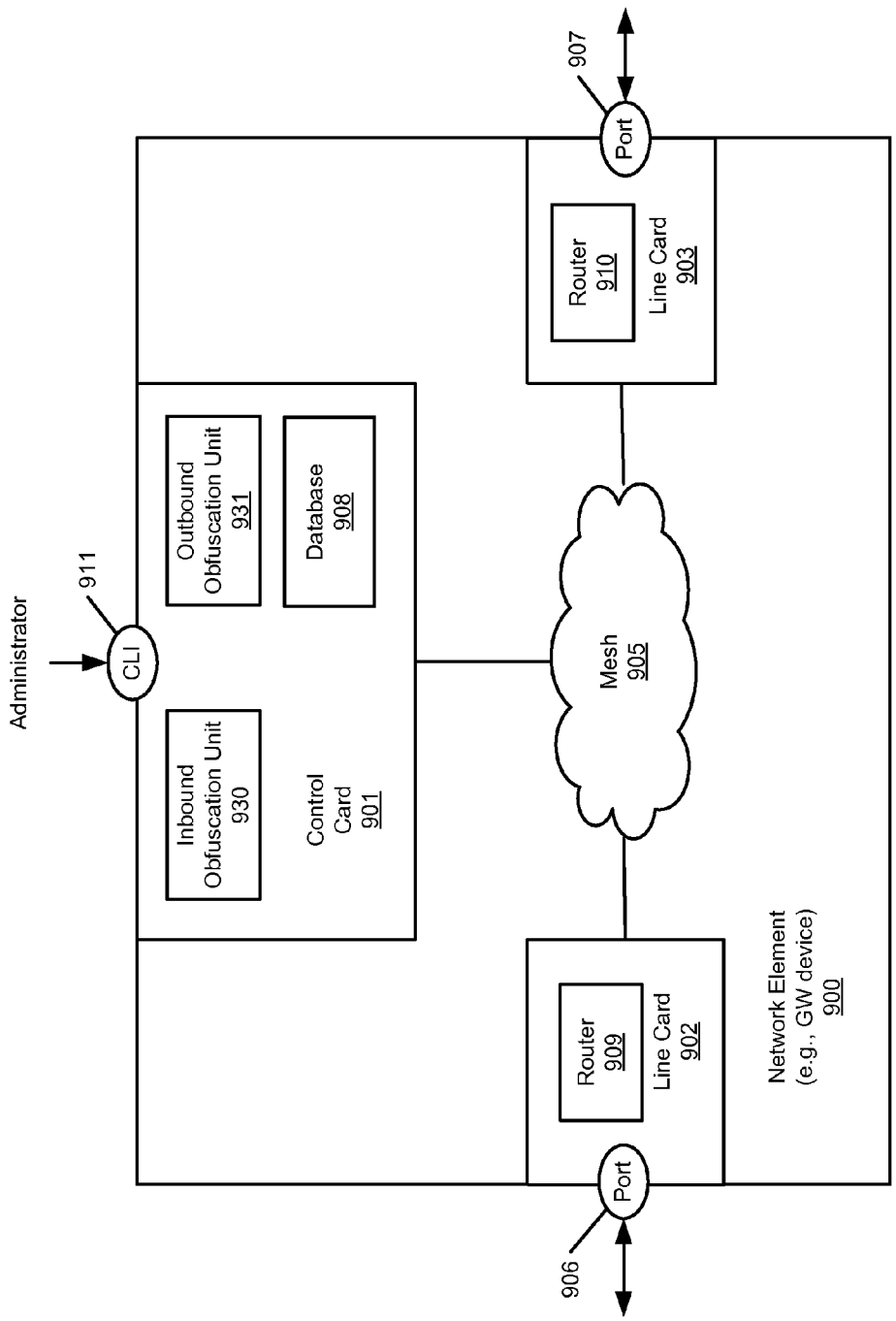
FIG. 9 is a block diagram illustrating a network element according to one embodiment of the invention.

FIG. 9 is a block diagram illustrating a network element according to one embodiment of the invention. Network element 900 may be implemented as any one of network nodes as shown in FIG. 1. For example, network element 900 may be implemented as a part of gateway device 102 of FIG. 1. Referring to FIG. 9, network element 900 includes, but is not limited to, a control card 901 (also referred to as a control plane) communicatively coupled to one or more line cards 902-903 (also referred to as interface cards or user planes) over a mesh 905, which may be a mesh network, an interconnect, a bus, or a combination thereof. A line card is also referred to as a data plane (sometimes referred to as a forwarding plane or a media plane). Each of the line cards 902-903 is associated with one or more interfaces (also referred to as ports), such as interfaces 906-907 respectively. Each line card includes routing functional block or logic (e.g., blocks 909-910) to route and/or forward packets via the corresponding interface according to a configuration (e.g., routing table) configured by control card 901, which may be configured by an administrator via an interface 911 (e.g., a command line interface or CLI).

According to one embodiment, control card 901 includes, but is not limited to, an inbound obfuscation unit 930, an outbound obfuscation unit 931, and a database 908. The outbound obfuscation unit 931 is adapted to perform an obfuscation operation, such as a permutation operation, on at least a portion (e.g., internal network portion) of a source IP address of a packet received from a local node over an internal or local network. The obfuscation operation is performed according to an obfuscation method which may be stored in database 908. The outbound obfuscation unit 931 is adapted to use the obfuscated source IP address to transmit the packet to the remote node over the external network without revealing the entire IP address associated with the local node.

The inbound obfuscation unit 930 is adapted to perform a deobfuscation operation, such as a permutation operation (e.g., reverse permutation), on at least a portion (e.g., internal network portion) of a destination IP address of a packet received from a remote node of external network such as the Internet. The deobfuscation operation is performed according to an obfuscation method which may be stored in database 908. The inbound obfuscation unit 930 is adapted to use the obfuscated destination IP address to transmit the packet to the local node over the internal network. As a result, the local node can be reached by the remote node without having to reveal the internal network portion of the IP address associated with the local node. Note that the obfuscation units 930-931 may be implemented in the line cards 902-903 and used by routers 909-910 (as a part of an obfuscation unit) respectively.

In addition, when there is a need to change the obfuscation method, during a grace period, a mapping table such as the one as shown in FIG. 6 may be maintained in the database 908 to identify which flow of packets is associated with which obfuscation method. When a packet is processed within network element 900, a proper obfuscation method is identified and is utilized for obfuscating an IP address (e.g., source or destination IP address) of the packet. The mapping table may be discarded once the grace period is over or alternatively, such a mapping table may be stored in a non-volatile memory such as a disk for the purpose of restarting or rebooting the network element 900. Furthermore, the mapping table may be "pushed" down to the line cards 902-903 and used by routers 909-910 (as a part of an obfuscation unit) respectively.

Referring back to FIG. 9, in the case that the network element 900 is a router (or is implementing routing functionality), the control plane 901 typically determines how data (e.g., packets) is to be routed (e.g., the next hop for the data and the outgoing port for that data), and the data plane (e.g., lines cards 902-903) is in charge of forwarding that data. For example, the control plane 901 typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane (e.g., database 908). The control plane 901 programs the data plane (e.g., line cards 902-903) with information (e.g., adjacency and route information) based on the routing structure(s). For example, the control plane 901 programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main routing information base (RIB) based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element 900 can store one or more bridging tables that are used to forward data based on the layer 2 information in this data.

For the purpose of illustration only, only one control card and two line cards are shown in FIG. 9. Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms. As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, palm tops, mobile phones, smart phones, multimedia phones, Voice Over Internet Protocol (VOIP) phones, portable media players, global positioning system (GPS) units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public Web pages (free content, store fronts, search services, etc.), private Web pages (e.g., username/password accessed Web pages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Note that network element 900 is described for the purpose of illustration only. More or fewer components may be implemented dependent upon a specific application. For example, although a single control card is shown, multiple control cards may be implemented, for example, for the purpose of redundancy. Similarly, multiple line cards may also be implemented on each of the ingress and egress interfaces. Also note that some or all of the components as shown in FIG. 9 may be implemented in hardware, software, or a combination of both.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a network element interfacing an internal network with an external network for translating an Internet Protocol (IP) address of a client of the internal network and using the translated IP address to route packets associated with the client to and from a remote node of the external network without exposing an internal network portion of the IP address of the client to the remote node, the method comprising the steps of:

receiving a first packet from the client over the internal network that is destined for the remote node of the external network, wherein the first packet is associated with a first packet flow, and wherein the first packet includes a source IP address separated into an internal network portion that identifies a location of the client in the internal network and separated into an external network portion that identifies a location of the internal network accessible by the external network;

obfuscating the internal network portion of the source IP address of the first packet to conceal the location of the client in the internal network according to a first invertible function;

rewriting the source IP address of the first packet by rewriting the internal network portion of the source IP address of the first packet with the obfuscated internal network portion while maintaining the current external network portion of the source IP address;

transmitting the first packet to the remote node over the external network with the rewritten internal network portion of the source IP address, whereby the location of the client in the internal network is concealed from the remote node while allowing the remote node to reach the internal network through the external network portion of the source IP address;

collecting flow state information about existing communication sessions, wherein the flow state information is to be used to identify packets belonging to the existing communication sessions, wherein the existing communication sessions include the first packet flow;

beginning a stateful grace period by, for packets received from clients of the internal network and destined to the external network, using a second invertible function for obfuscating those of the received packets not identified as belonging to the existing communication sessions in the collected flow state information, while contemporaneously obfuscating those of the received packets identified as belonging to the existing communication sessions in the collected flow state information using the first invertible function for at least a period of time until an end of the stateful grace period; and ending the stateful grace period by using only the second invertible function to obfuscate packets received from the clients of the internal network that are destined to the external network until another stateful grace period begins.

2. The method of claim 1, wherein the step of obfuscating comprises permuting a subnet identifier and an interface identifier of the source IP address.

3. The method of claim 1, wherein the step of obfuscating comprises performing at least one of a bit flip and bit swap operations on a plurality of bits of the internal network portion of the source IP address.

4. The method of claim 1, further comprising the steps of:

during the stateful grace period, receiving a second packet from the remote node over the external network destined for the client, wherein the second packet is associated with the first packet flow and includes a destination IP address that matches the rewritten IP address;

responsive to identifying the second packet as belonging to the existing communication sessions in the collected flow state information, deobfuscating the destination IP address of the second packet according to an inverse of the first invertible function to reveal the location of the client in the internal network;

replacing the destination IP address of the second packet with the deobfuscated destination IP address, wherein the deobfuscated destination IP address is identical to the original source IP address of the first packet;

transmitting the second packet to the client over the internal network, whereby the client is reachable by the remote node without revealing the location of the client in the internal network;

during the stateful grace period, receiving a third packet from the client over the internal network that is destined for the remote node of the external network, wherein the third packet belongs to the first packet flow;

responsive to identifying the third packet as belonging to the existing communication sessions in the collected flow state information, obfuscating the internal network portion of the source IP address of the third packet to conceal the location of the client in the internal network according to the first invertible function;

rewriting the source IP address of the third packet by rewriting the internal network portion of the source IP address of the third packet with the obfuscated internal network portion while maintaining the current external network portion of the source IP address; and transmitting the third packet to the remote node over the external network with the rewritten internal network portion of the source IP address, whereby the location of the client in the internal network is concealed from the remote node while allowing the remote node to reach the internal network through the external network portion of the source IP address.

5. The method of claim 4, further comprising the steps of:

during the stateful grace period, receiving a fourth packet from the client over the internal network that is destined for the remote node of the external network, wherein the fourth packet is associated with a second packet flow not belonging to the existing communication sessions in the collected flow state information;

responsive to identifying that the fourth packet does not belong to the existing communication sessions in the collected flow state information, obfuscating the internal network portion of the source IP address of the fourth packet to conceal the location of the client in the internal network according to the second invertible function;

rewriting the source IP address of the fourth packet by rewriting the internal network portion of the source IP address of the fourth packet with the obfuscated internal network portion while maintaining the current external network portion of the source IP address;

transmitting the fourth packet to the remote node over the external network with the rewritten internal network portion of the source IP address, whereby the location of the client in the internal network is concealed from the remote node while allowing the remote node to reach the internal network through the external network portion of the source IP address;

during the stateful grace period, receiving a fifth packet from the remote node over the external network destined for the client, wherein the fifth packet is associated with the second packet flow;

responsive to identifying that the fifth packet does not belong to the existing communication sessions in the collected flow state information, deobfuscating the destination IP address of the fifth packet according to an inverse of the second invertible function to reveal the location of the client in the internal network;

replacing the destination IP address of the fifth packet with the deobfuscated destination IP address; and transmitting the fifth packet to the client over the internal network, whereby the client is reachable by the remote node without revealing the location of the client in the internal network.

6. A network element interfacing an internal network with an external network for translating an Internet Protocol (IP) address of a client of the internal network and using the translated IP address to route packets associated with the client to and from a remote node of the external network without exposing an internal network portion of the IP address of the client to the remote node, the network element comprising:

a first receiver adapted to receive a first packet from the client over the internal network that is destined for a remote node of the external network, wherein the first packet includes a source IP address separated into an internal network portion that identifies a location of the client in the internal network and separated into an external network portion that identifies a location of the internal network accessible by the external network, wherein the first packet is associated with a first packet flow;

a first address translation unit adapted to:
 obfuscate the internal network portion of the source IP address of the first packet according to a first invertible function to conceal the location of the client in the internal network, wherein the first address translation unit is adapted to rewrite the internal network portion of the source IP address of the first packet with the obfuscated internal network portion while maintaining the current external network portion of the source IP address,
 collect flow state information about existing communication sessions, wherein the flow state information is to be used to identify packets belonging to the existing communication sessions,
 begin a stateful grace period by, for packets received from clients of the internal network and destined to the external network, using a second invertible function for obfuscating those of the received packets not identified as belonging to the existing communication sessions in the collected flow state information, while contemporaneously obfuscating those of the received packets identified as belonging to the existing communication sessions in the collected flow state information using the first invertible function for at least a period of time until the end of the stateful grace period, and
 end the stateful grace period by using only the second invertible function to obfuscate packets received from the clients of the internal network that are destined to the external network until another stateful grace period begins; and a first transmitter adapted to transmit the first packet to the remote node over the external network with the rewritten internal network portion of the source IP address, whereby the location of the client in the internal network is concealed from the remote node while allowing the remote node to reach the internal network through the external network portion of the source IP address.

7. The network element of claim 6, wherein the first address translation unit is adapted to permute a subnet identifier and an interface identifier of the source IP address.

8. The network element of claim 6, wherein the first address translation unit is adapted to perform at least one of a bit flip and bit swap operations on a plurality of bits of the internal network portion of the source IP address.

9. The network element of claim 6, wherein:
the first receiver is further adapted to during the stateful grace period:
 receive, a second packet from the remote node over the external network destined for the client, wherein the second packet is associated with the first packet flow and includes a destination IP address that matches the rewritten IP address, and
 receive a third packet from the client over the internal network that is destined for the remote node of the external network, wherein the third packet is associated with the first packet flow;

the first address translation unit is further adapted to during the stateful grace period:
 responsive to an identification of the second packet as belonging to the existing communication sessions in the collected flow state information, deobfuscate the destination IP address of the second packet according to an inverse of the first invertible function to reveal the location of the client in the internal network, wherein the first address translation unit is further adapted to replace the destination IP address of the second packet with the deobfuscated destination IP address, wherein the deobfuscated destination IP address is identical to the original source IP address of the first packet, and
 responsive to an identification of the third packet as belonging to the existing communication sessions in the collected flow state information, obfuscate the internal network portion of the source IP address of the third packet to conceal the location of the client in the internal network according to the first invertible function; and the first transmitter is further adapted to during the stateful grace period:
 transmit the second packet to the client over the internal network, whereby the client is reachable by the remote node without revealing the location of the client in the internal network, and
 transmit the third packet to the remote node over the external network with a rewritten internal network portion of the source IP address including the obfuscated internal network portion of the source IP address of the third packet, whereby the location of the client in the internal network is concealed from the remote node while allowing the remote node to reach the internal network through the external network portion of the source IP address.

10. The network element of claim 9, wherein:
the first receiver is further adapted to during the stateful grace period:
 receive a fourth packet from the remote node over the external network destined for the client, wherein the fourth packet is associated with a second packet flow not belonging to the existing communication sessions in the collected flow state information, and
 receive a fifth packet from the client over the internal network that is destined for the remote node of the external network, wherein the fifth packet is associated with the second packet flow;

the first address translation unit is further adapted to during the stateful grace period:
 responsive to an identification of the fourth packet as not belonging to the existing communication sessions in the collected flow state information, deobfuscate the destination IP address of the fourth packet according to an inverse of the second invertible function to reveal the location of the client in the internal network, and
 responsive to an identification of the fifth packet as not belonging to the existing communication sessions in the collected flow state information, obfuscate the internal network portion of the source IP address of the fifth packet to conceal the location of the client in the internal network according to the second invertible function;

the first transmitter is further adapted to during the stateful grace period:
  transmit the fourth packet including the deobfuscated destination IP address of the fourth packet to the client over the internal network, whereby the client is reachable by the remote node without revealing the location of the client in the internal network, and
  transmit the fifth packet to the remote node over the external network with the obfuscated internal network portion of the source IP address, whereby the location of the client in the internal network is concealed from the remote node while allowing the remote node to reach the internal network through the external network portion of the source IP address.

11. A method in a network element interfacing an internal network with an external network for translating an Internet Protocol (IP) address of a client of the internal network and using the translated IP address to route packets associated with the client to and from a remote node of the external network without exposing an internal network portion of the IP address of the client to the remote node, the method comprising the steps of:
  receiving a first packet from the remote node over the external network destined for the client and associated with a first packet flow, the first packet including a destination IP address having an internal network portion that has been obfuscated;
  deobfuscating the internal network portion of the destination IP address of the first packet according to an inverse of a first invertible function to reveal a location of the client in the internal network, wherein the internal network portion of the destination IP address of the first packet had been obfuscated using the first invertible function when sending an earlier packet from the client to the remote node;
  replacing the destination IP address of the first packet with the deobfuscated destination IP address;
  transmitting the first packet to the client over the internal network, whereby the client is reachable by the remote node without revealing the location of the client in the internal network;
  collecting flow state information about existing communication sessions, wherein the flow state information is to be used to identify packets belonging to the existing communication sessions, wherein the existing communication sessions include the first packet flow;
  beginning a stateful grace period by, for packets received from the external network and destined to clients of the internal network, using an inverse of a second invertible function for deobfuscating those of the received packets not identified as belonging to the existing communication sessions in the collected flow state information, while contemporaneously deobfuscating those of the received packets identified as belonging to the existing communication sessions in the collected flow state information using the first invertible function for at least a period of time until an end of the stateful grace period; and
  ending the stateful grace period by using only the inverse of the second invertible function to statelessly deobfuscate packets received from the external network destined to the clients of the internal network until another stateful grace period begins.

12. The method of claim 11, wherein the step of deobfuscating comprises permuting a subnet identifier and an interface identifier of the destination IP address.

13. The method of claim 11, wherein the step of deobfuscating comprises performing at least one of a bit flip and bit swap operations on a plurality of bits of the internal network portion of the destination IP address.

14. The method of claim 11, further comprising the steps of:
  during the stateful grace period, receiving a second packet from the client over the internal network that is destined for a remote node of the external network and associated with the first packet flow, wherein the second packet includes a source IP address separated into an internal network portion that identifies a location of the client in the internal network and separated into an external network portion that identifies a location of the internal network accessible by the external network;
  responsive to identifying the second packet as belonging to the existing communication sessions in the collected flow state information, obfuscating the internal network portion of the source IP address of the second packet according to the first invertible function to conceal the location of the client in the internal network;
  rewriting the internal network portion of the source IP address of the second packet with the obfuscated internal network portion while maintaining the current external network portion of the source IP address;
  transmitting the second packet to the remote node over the external network with the rewritten internal network portion of the source IP address, whereby the location of the client in the internal network is concealed from the remote node while allowing the remote node to reach the internal network through the external network portion of the source IP address;
  during the stateful grace period, receiving a third packet from the remote node over the external network destined for the client, wherein the third packet is associated with the first packet flow;
  responsive to identifying the third packet as belonging to the existing communication sessions in the collected flow state information, deobfuscating the destination IP address of the third packet according to an inverse of the first invertible function to reveal the location of the client in the internal network;
  replacing the destination IP address of the third packet with the deobfuscated destination IP address, wherein the deobfuscated destination IP address is identical to the original source IP address of the first packet; and
  transmitting the third packet to the client over the internal network, whereby the client is reachable by the remote node without revealing the location of the client in the internal network.

15. The method of claim 14, wherein the obfuscated internal network portion of the source IP address of the second packet matches the internal network portion of the destination IP address of the first packet.

16. The method of claim 14, further comprising the steps of:
  during the stateful grace period, receiving a fourth packet from the client over the internal network that is destined for the remote node of the external network, wherein the fourth packet is associated with a second packet flow not belonging to the existing communication sessions in the collected flow state information;
  responsive to identifying that the fourth packet does not belong to the existing communication sessions in the collected flow state information, obfuscating the internal network portion of the source IP address of the fourth packet to conceal the location of the client in the internal network according to the second invertible function;

rewriting the source IP address of the fourth packet by rewriting the internal network portion of the source IP address of the fourth packet with the obfuscated internal network portion while maintaining the current external network portion of the source IP address;

transmitting the fourth packet to the remote node over the external network with the rewritten internal network portion of the source IP address, whereby the location of the client in the internal network is concealed from the remote node while allowing the remote node to reach the internal network through the external network portion of the source IP address;

during the stateful grace period, receiving a fifth packet from the remote node over the external network destined for the client, wherein the fifth packet is associated with the second packet flow;

responsive to identifying that the fifth packet does not belong to the existing communication sessions in the collected flow state information, deobfuscating the destination IP address of the fifth packet according to an inverse of the second invertible function to reveal the location of the client in the internal network;

replacing the destination IP address of the fifth packet with the deobfuscated destination IP address; and transmitting the fifth packet to the client over the internal network, whereby the client is reachable by the remote node without revealing the location of the client in the internal network.

* * * * *

UNITED STATES PATENT AND TRADEMARK OFFICE
CERTIFICATE OF CORRECTION

| | | |
|---|---|---|
| PATENT NO. | : 8,934,487 B2 | Page 1 of 1 |
| APPLICATION NO. | : 12/613080 | |
| DATED | : January 13, 2015 | |
| INVENTOR(S) | : Vogt et al. | |

It is certified that error appears in the above-identified patent and that said Letters Patent is hereby corrected as shown below:

In the specification

In Column 8, Line 45, delete "f( )" and insert -- f( ), --, therefor.

Signed and Sealed this
Sixteenth Day of February, 2016

Michelle K. Lee
*Director of the United States Patent and Trademark Office*